United States Patent [19]

Neuerburg

[11] 4,452,034
[45] Jun. 5, 1984

[54] ELONGATED CUTTING MECHANISM HAVING A REMOVABLE LATERAL SHIELD

[75] Inventor: Horst Neuerburg, Haegen, France

[73] Assignee: S.A. Kuhn, Saverne, France

[21] Appl. No.: 361,458

[22] Filed: Mar. 24, 1982

[30] Foreign Application Priority Data

Apr. 2, 1981 [FR] France ............................ 81 06997

[51] Int. Cl.$^3$ .......................................... A01D 55/18
[52] U.S. Cl. .................................. 56/320.1; 56/13.6; 56/295; 56/320.1
[58] Field of Search ...................... 56/12.7, 13.6, 255, 56/256, 295, 320.1, DIG. 24, 192, 16.4, 12.3

[56] References Cited

U.S. PATENT DOCUMENTS

| | | | |
|---|---|---|---|
| 4,106,273 | 8/1978 | Oosterling et al. | 56/295 |
| 4,126,988 | 11/1978 | Oosterling et al. | 56/295 |
| 4,166,350 | 9/1979 | Werner | 56/295 |
| 4,183,196 | 1/1980 | Oosterling et al. | 56/295 |
| 4,201,033 | 5/1980 | Meek et al. | 56/295 |
| 4,304,088 | 12/1981 | Werner | 56/13.6 |
| 4,330,982 | 5/1982 | Vissers et al. | 56/192 |

Primary Examiner—Robert Peshock
Assistant Examiner—John G. Weiss
Attorney, Agent, or Firm—Ernest F. Marmorek

[57] ABSTRACT

A cutting mechanism which has an elongated frame defining a cutting side, and which is adapted to be fitted to a mower or the like so that the cutting side faces in the direction of advancement of the mower, includes a plurality of disks rotatably mounted on the frame. Each disk includes at least one cutting blade, and at least one disk may operatively be driven from beneath. A disk protector for each disk is mounted on the frame near the cutting side. A disk drive which is mounted on the frame, is coupled to at least one disk, and is adapted to be driven by an external source for driving the disk. A lateral protection device is releasably mounted to the frame near at least one of its end portions and is operable to shield the disk disposed near said end portion against impact by a foreign object.

9 Claims, 7 Drawing Figures

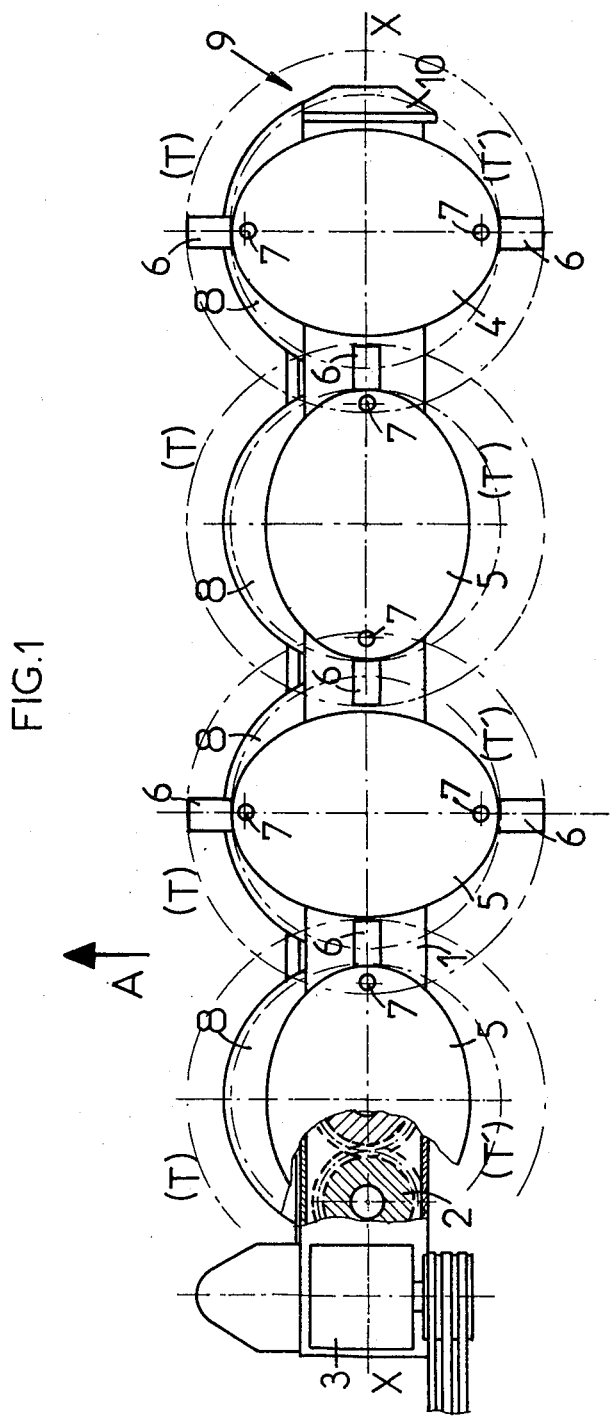

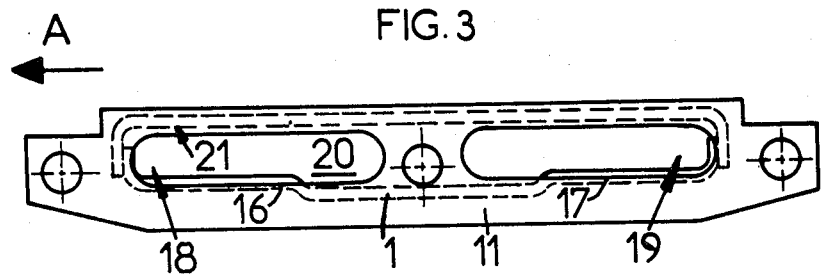
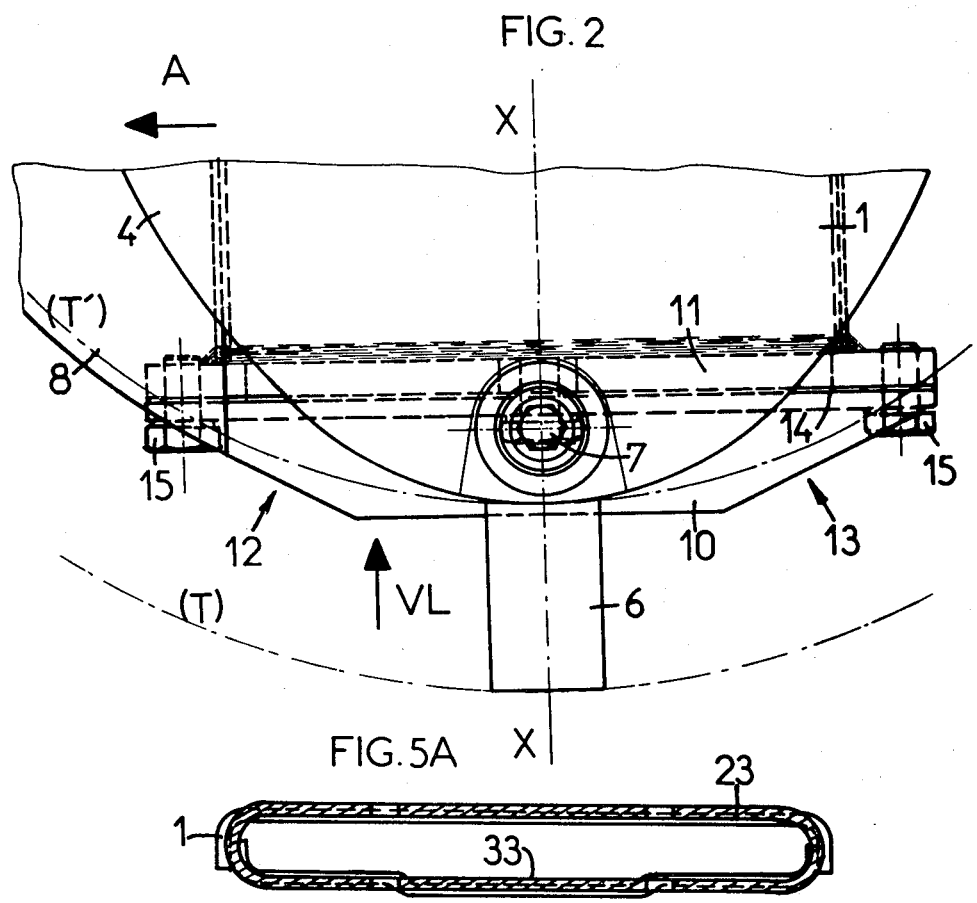

ELONGATED CUTTING MECHANISM HAVING A REMOVABLE LATERAL SHIELD

BACKGROUND OF THE INVENTION

Mowers of the type having a cutting mechanism including a plurality of disks are disclosed in pending Patent Application Ser. Nos. 330,271 and 330,272, filed on Dec. 14, 1981, by the inventor of the present invention, and assigned to the same assignee.

It has been found, however, that the cutting mechanism incorporated into a mower of the aforedescribed type can be damaged when an end thereof impacts with a foreign object, such as a large stone, a tree, or the like.

SUMMARY OF THE INVENTION

It is accordingly an object of the present invention to obviate the aforesaid disadvantages, and to render the cutting mechanism more robust, by protecting it particularly from impact by a foreign object.

This object is attained in a cutting mechanism of the aforedescribed type which has an elongated frame defining a cutting side and is adapted to be fitted to a mower or the like, so that the cutting side faces in the direction of advancement of the mower. A plurality of disks are rotatably mounted on the frame and each disk includes at least one cutting blade. At least one of the disks may operatively be driven from beneath. A disk-protector for each disk is mounted on the frame near the cutting side. A disk drive which is mounted on the frame, is coupled to at least the one disk, and is adapted to be driven by an external source for driving the disk. A protection device is releasably mounted to the frame near at least one of its end portions and is operable to shield the disk situated at this end portion against impact by a foreign object.

The disk drive includes a plurality of transmission elements which are generally gear wheels or bevel gears; the bevel gears, for example, are driven by a shaft which extends through the entire length of the frame.

The frame may be constituted by two identical or non-identical sectons which are connected to one another, for example, by welding in a manner to create, for example, a hollow casing in which the transmission members are disposed.

The frame has the form of, for example, a gear box in which the aforesaid transmission elements may be easily placed, and for ease of manufacture the width of the frame is constant throughout its length. In front of the frame, namely along its elongated cutting side which faces in the direction of advancement of the mower, there are provided disk protectors which advantageously extend slightly beyond the maximal trajectory of the disks, so as to protect the disks against any obstacle or foreign object which might appear in front of the cutting mechanism when it operates in a mower. Beyond providing the aforesaid frontal protection of the disks, it is also very advantageous to provide lateral protection for that disk which is disposed at the outer most end portion of the frame relative to a tractor onto which the mower including the cutting mechanism is hitched, or for those disks which are disposed at both end portions of the frame of the cutting mechanisms whose cutting width is equal to the length of their frame.

As an operator of a mower would naturally desire to gather as large a harvest as possible, he may move the mower close to the edge of a field in which the mowing operations take place. It is therefore quite possible that during operation of the mower, or during a manoeuvre of the same, that one end portion of the cutting mechanism collides with an obstacle, such as a large stone, a tree, or the like, which may be situated near the edge of the field in which the mowing operations take place.

If the disk disposed at the said one of the end portions of the cutting mechanism is not suitably shielded or protected, namely, if the said disk extends beyond the length of the frame, any impact of a foreign object with the said disk can entail grave consequences. In fact, beyond the deformation of the disk and the instantaneous elevated distorsion on his disk-bearingblock and the bearings lodged therein, the impact may lead to a rupture of one or several transmission elements.

This is even more serious if such a mishap occurs when the mower is first put into operation.

At first blush, it might seem possible to extend the length of the frame which contains the transmission elements in such a way that it extends beyond the maximum trajectory of the disk located near an end portion of the longitudinal frame.

In such an eventuality, when the end portion of the cutting mechanism collides with one of the aforedescribed objects, the disk disposed near the said end portion of the frame is not likely to be demaged.

Although such a mechanism protects the disk near the end portion of the frame efficiently, such a design has other serious drawbacks.

The end portion of the longitudinal frame extending beyond the outermost disk is therefore likely to be subjected to repeated shocks, of which some may be quite severe. Such impacts cause considerable wear and tear to the end portion of the longitudinal frame, and can cause fissures in the frame as well.

In general the frame or gear box for the disks will also contain a lubricant which can ooze from the frame through the fissures thus created. If the operator of the mower notices such a damage in a timely fashion, the mower must be taken to a special repair shop for change the complete frame. If, however, the operator continues to mow without becoming aware that the lubricant oozes from the frame, in time the gear mechanism within the frame will operate without any lubricant, so as to be dry, and will become so overheated that the bearings and the gear wheels will be damaged beyond repair, equivalent to a complete destruction of the entire cutting mechanism.

In any case, the mower or cutting mechanism will have to be repaired by an expertly trained repairman. This repair usually entails high costs in view of the expense of the parts in the frame which must be replaced, and deprives the operator of the mower of its use when he needs the mower most.

To remedy these disadvantages, the cutting mechanism of the present invention has a frame in which at least one end portion thereof is provided with lateral protection means which are releasably mounted on the frame.

This arrangement has several advantages. The lateral protection means may be a piece which is relatively simple to manufacture, and therefore relatively inexpensive.

On the other hand, when this lateral protection means becomes worn, it can be easily replaced by the operator himself at a relatively low cost, and without putting the cutting mechanism out of commission for a longtime.

According to another feature of the invention, the lateral protection means may be implemented in the form of a removable cover closing the end portion of the frame. As has already been mentioned, it is known to implement a frame or gear box by means of, for example, two sheet iron sections or castings which are welded together. In this case it is advantageous to machine the different borings for the mounting of the transmission elements and the disk-bearingblocks guiding the rotation of the disks after the welding operation, so that any deformation due to the welding operation does not adversely effect the precision of said machinings. It is therefore indispensable that the interior of the frame or gear box be cleaned or washed prior to the transmission elements being mounted thereon, so as to eliminte all impurities, such as metal shavings, due to the machining process. Otherwise the transmission elements could be subjected to rapid wear, or this could even result in the fracture of some of the said transmission elements if, during operation, the shavings wedge between the teeth of the gear wheels.

Also it is equally useful that the interior of the frame or gear box can be easily cleaned or washed after repair of the same, or after a lubricant is drained from the said frame.

Hence those elements of the frame or gear box which serve to receive the lateral cover are disposed in such a manner that they do not impede cleansing of the frame or by means of a washing fluid.

As the transmission elements are constituted by a shaft and bevel gears, the above-noted characteristics have also the advantage to permit easy assembly and dissembly of the shaft and its associated gears.

According to another feature of the invention, the end portion of the frame does not extend beyond the maximal trajectory of the disk arranged at that end portion.

On the other hand, the portion of the lateral protection means or cover which extends in a region frontwards of a line joining the axes of rotation of the disks, is substantially disposed within a region near the trajectory of the so protected disk, but does not extend beyond the trajectory of the blades of the said protected disk.

In a preferred implementation of the present invention the lateral protection means or cover is joined in a smoothly continuous manner to the disk protector for the disk mounted near the end portion of the frame.

This latter feature prevents any enmeshment of the crop between the lateral protection means or cover and the disk protector, leading to possible jamming of the mower. In summary the lateral protection means or cover protects the disk located at the end portion of the frame or cover efficiently and in a simple manner, and the said lateral protection means or cover can moreover be easily replaced.

Other objects of the invention will in part appear hereinafter.

BRIEF DESCRIPTION OF THE DRAWINGS

For a fuller understanding of the nature and object of the invention, reference should be had to the following detailed description, taking in connection with the accompanying drawings in which:

FIG. 1 is a top plan view of the cutting mechanism, according to the present invention;

FIG. 2 is a large scale plan view of an end portion of the cutting mechanism, according to the present invention;

FIG. 3 is a side view of an end portion of the cutting mechanism, according to the present invention;

FIG. 5A is a large scale elevation view of an end portion of the frame alone, according to the version of FIG. 5.

DESCRIPTION OF THE PREFERRED EMBODIMENTS

Figure 4:
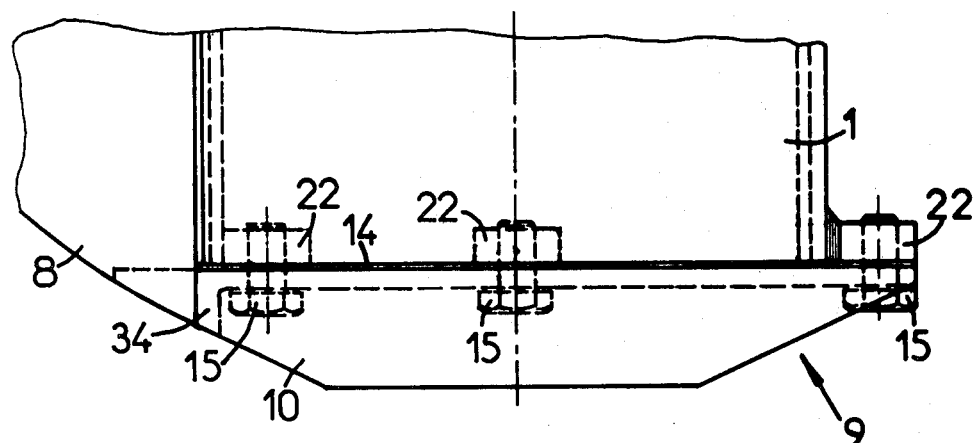
FIG. 4 is a large scale plan view of another version of the end portion of the cutting mechanism, according to the present invention.

In carrying the invention into effect and referring in particular to FIG. 1, the cutting mechanism according to the present invention includes a frame or gear box 1, in which there are mounted a plurality of transmission elements, such as gear wheels 2. The gear wheels 2 are driven by, for example, the power take off of a (non-illustrated) tractor, by means of a drive mechanism 3 containing gear wheels, pulleys, belts or the like. The gear wheels 2 in turn drive the disks 4 and 5, each of which is equipped with two cutting blades 6 diametrically opposite one another. It will be understood that the disks 4 and 5 can be equipped with less or more than two blades 6. The blades 6 may rotate freely around axes 7 provided on each disk 4 or 5. The blades 6 are maintained in their operative position by means of centrifugal forces and consequently describe circular trajectories T, while the disks 4 and 5 are rotationally driven. Since the blades 6 rotate freely about their respective axes, they are arranged to retract below the respective disks 4 and 5, when they encounter an obstacle. In front of the mower, as viewed in the direction of advancement of the mower illustrated by the arrow A, there are arranged below each disk 4 and 5 circular disk protectors 8. Each of the disk protectors 8 has a radius slightly greater than that of the trajectories T' of the disks 4 and 5, but smaller than the radius of the trajectories T of the blades 6. Thus the disks 4 and 5 are protected against any obstacle or foreign object which might be located on the terrain on which the mower operates.

At an end portion 9 of the cutting mechanism there is arranged a protection means 10 for the disk 4. This protection means is dimensioned so that it can protect the disk 4 against any lateral shock. The protection means 10, which may, for example, be implemented by a cover, extends beyond the trajectory T' of the disk 4 sufficiently so as to protect the disk 4, but does not extend beyond the trajectory T of the blades 6. In this manner the blades 6 can freely cut the crop without there occurring any mixing between the crop which have been cut, and those which still remain on the ground.

Figure 5:
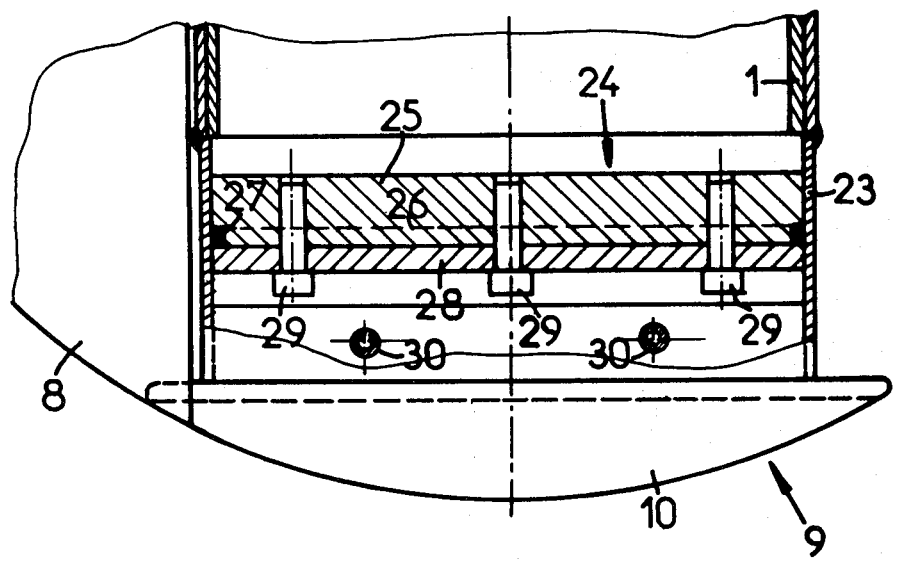
FIG. 5 is a large scale plan view of still another version of the end portion of the cutting mechanism, according to the present invention.

As will be seen from FIG. 2, a plate 11 is welded to an end portion of the frame 1. Frontwardly, as viewed in the direction of the arrow A, the protection means 10 is joined to the disk protector 8 in an smoothly continuous fashion. As shown in FIG. 2, the protection means or cover 10 has a corner 12 cut in such a shape that the straight line thus defined is tangent with the circle defined by the outer perimeter of the disk protector 8. The other corner 13 of the lateral protection means 10 has a slope so that the protection means 10 or cover can be secured to either end portion of the frame 1, or to both end portions. The latter installation applies where the cutting mechanism has a cutting width equal to its length, which is true of certain frontal cutting mechanisms. It will be understood that the shape of the corners 12, 13 of the lateral protection means or cover 10 can be made in the form of a curve of arbitrary shape, such as, for example, a circle which has a radius substantially identical to that of the disk protector 8, as shown in FIG. 5. Between the plate 11 welded to the end portion of the frame 1 and the protection means or cover 10 there are disposed sealing mean, such as a gasket 14 made of paper, copper, synthetic material or the like. As a result of the pressure exerted by the screws 15 which secure the protection means or cover 10 to the plate 11, the sealing means, for example the gasket 14, is compressed and prevents therefore the lubricant contained in the frame 1 from leaking therefrom.

In the implementation shown, for example, in FIG. 2 it will be seen that the head of the screw 15 extends slightly beyond the corners 12 and 13 of the cover 10. In order to reduce wear and tear of the head of the screws 15, particularly the screw 15 located most forwardly in the sense of the arrow A, it is possible to provide shielding means 34 for the head of the screw 15 which can be an integral part of the protection means or cover 10 as can be shown in FIG. 4.

From FIG. 3 it will be seen that the plate 11 has two apertures 16 and 17, which extend respectively up to the front zone 18 and rear zone 19 of the interior space 20 of the frame 1. Here it will be seen that the borders of the openings 16 and 17 substantially hug the internal contour of the cross-section of the frame 10. This arrangement permits a good washing of the interior of the frame 1. By inclining the zone 18 or 19 slightly downwardly, the cleaning fluid can, during its outward travel, take along all the impurities, such as metal shavings, which might be found interiorly of the frame 1. It will be understood that a single aperture 16 or 17 may be sufficient to properly discharge the cleaning fluid with the impurities contained therein.

FIG. 4 is another version of implementing the protection means or cover 10. Flanges 22 are welded onto the frame 1, each being formed with a hole, which may or may not be threaded, according to the method of attachment required, with the aid of a single bolt, or by means of screws and nuts.

After welding of the flanges 22, and before mounting the protection means or cover 10, the face of the end portion 9 of the frame 1 may be machined in order to ensure that this face is completely flat, which will improve the tightness or sealing quality of its subsequent seal. As has already been described with respect to the implementation of FIG. 2, between the end portion of the frame 1, and the protection means or cover 10 there is disposed sealing means, such as a gasket 14, which will be compressed when the screws 15 are tightened.

In FIG. 5 it will be seen that a member 23 is welded onto the end portion 9 of the frame 1. The interior volume of the member 23 is such that the contour 33 of its cross section is a closed smooth curve free of any projections or sharp angles, as can be shown in FIG. 5A. The member 23 can, for example, be implemented by means of a tube which has been partially flattened.

The mounting of the sealing mechanism 24 and of the protection means or cover 10 is accomplished as follows:

Into the member 23 there is inserted a gasket holder 25. This gasket holder has an outer contour substantially identical with the inner contour of the member 23, so that any play between the member 23 and the holder 25 is minimal. A shoulder 26 is provided on the gasket holder 25, on which there is disposed a gasket 27.

Subsequently a compression plate 28 is inserted into the member 23, which also has an external shape matching substantially the internal contour of the member 23.

Subsequently the compression plate 28 is pressed alongside the gasket holder 25 and secured thereto by means of the screws 29. During subsequent compression acting on the gasket 27, the latter is compressed and abuts to the internal contour of the member 23 so that the sealing mechanism 24 is jammed into the member 23. As soon as the gasket holder 25 and the compression plate 28 make contact, the gasket 27 is sufficiently deformed to ensure tightness of the frame 1, so that the gasket 27 provides a fluid-proof seal in the member 23.

Subsequently the lateral protection means or cover 10 is mounted onto the member 23, and secured thereto by means of the pins 30.

Figure 6:
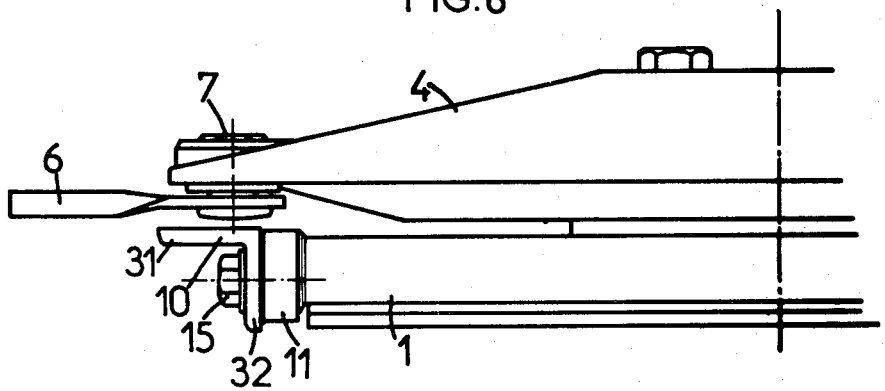
FIG. 6 is a large scale elevation view of an end portion of the cutting mechanism, according to the version of either FIG. 2 or FIG. 4.

In FIG. 6 it will be seen that the frame protection means or cover 10 is advantageously shaped like an L. The portion 31 of the L-shaped cover is then shaped, for example, as shown by the corners 12 and 13 of FIG. 2, or the contours shown in FIGS. 4 and 5. A portion 32 of the L-shaped cover 10 serves to secure the L-shaped cover 10 to the frame 1. As the L-shaped cover 10 also serves as a closure for the lateral opening in the frame 1, the portion 32 of the L-shaped cover fulfills this covering function.

It will be understood that the cross-sectional shape of the protection means or cover 10 can have a form other than that of the L shown.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. A cutting mechanism having an elongated frame defining a cutting side, and adapted to be fitted to a mower or the like so that the cutting side faces in the direction of advancement of the mower, comprising in combination,
a plurality of disks rotatably mounted on said frame, each including at least one cutting blade, at least one of said disks being operatively drivable from beneath, said frame further including two end portions at least one of said end portions having an opening,
a disk protector for each of said disks mounted on said frame near said cutting side,
drive means mounted on said frame coupled to at least said one disk for driving said disk, and
protecting means releasably mounted to said frame near said one open frame end portion and upon being mounted protecting the disk located at said end portion against lateral impact by a foreign object and closing said opening, and
said frame further including another side opposite said cutting side and a cross-section of a predetermined internal contour, said opening extending near at least one of said sides and substantially lining at least part of said contour so as to provide a conduit for discharging cleaning fluid along with any impurities contained therein during a washing of the interior of said frame.

2. A cutting mechanism having an elongated frame defining a cutting side, and adapted to be fitted to a mower or the like so that the cutting side faces in the direction of advancement of the mower,
  comprising in combination,
  a plurality of disks rotatably mounted on said frame, each including at least one cutting blade, at least one of said disks being operatively derivable from beneath, said frame further including two end portions at least one of said end portions having an opening, said frame further including another side opposite said cutting side and a cross-section of a predetermined internal contour, said opening extending near at least one of said sides and substantially lining at least part of said contour so as to provide a conduit for discharging cleaning fluid along with any impurities continued therein during a washing of the interior of said frame.
  a disk protector for each of said disks mounted on said frame near said cutting side,
  drive means mounted on said frame compled to at least said one disk for driving said disk, and
  protecting means releasably mounted to said frame near said one open frame end portion and upon being mounted protecting the disk located at said end portion against lateral impact by a foreign object and closing said opening.

3. A cutting mechanism as claimed in claim 2, further comprising a plate secured to said one open end portion and securing means securing said protecting means to said plate.

4. A cutting mechanism as claimed in claim 2, comprising at least one flange secured to said one open end portion and securing means securing said protecting means to said one flange.

5. A cutting mechanism as claimed in claim 3 or 4 further including shielding means shielding said securing means from wear and tear.

6. A cutting mechanism as claimed in claim 5, wherein said shielding means is located on protecting means.

7. A cutting mechanism as claimed in claim 1 or 2, further comprising sealing means disposed between said one open end portion and said protecting means.

8. A cutting mechanism as claimed in claim 7, wherein said predetermined internal contour of said cross-section is a closed and substantially smooth curve.

9. A cutting mechanism as claimed in claim 8, wherein said sealing means includes an elastic gasket forced to line said predetermined internal contour of said cross-section.

* * * * *

UNITED STATES PATENT AND TRADEMARK OFFICE
CERTIFICATE OF CORRECTION

PATENT NO. : 4,452,034

DATED : June 5, 1984

INVENTOR(S) : Horst Neuerburg

It is certified that error appears in the above-identified patent and that said Letters Patent is hereby corrected as shown below:

In claim 2, line 8 (line 13 of col. 7), "derivable" should read --drivable--;
line 18 (line 23 of col. 7), the period should be a comma;
lines 19 and 20 (lines 24 and 25 of col. 7), should be deleted;
line 21 (line 26 of col. 7), "compled" should read --coupled--;
line 24 (line 29 of col. 7), "frame" should be deleted.

Signed and Sealed this

Nineteenth Day of February 1985

[SEAL]

Attest:

DONALD J. QUIGG

Attesting Officer

Acting Commissioner of Patents and Trademarks